US006945539B2

(12) United States Patent
Whitlow et al.

(10) Patent No.: US 6,945,539 B2
(45) Date of Patent: Sep. 20, 2005

(54) SEAL RETAINER

(75) Inventors: Mark S. Whitlow, Columbia, SC (US); John S. Harr, Chapin, SC (US); Ryan D. McCall, Lexington, SC (US)

(73) Assignee: Garlock Sealing Technologies LLC, Palmyra, NY (US)

( * ) Notice: Subject to any disclaimer, the term of this patent is extended or adjusted under 35 U.S.C. 154(b) by 0 days.

(21) Appl. No.: 10/370,894

(22) Filed: Feb. 20, 2003

(65) Prior Publication Data

US 2003/0164594 A1 Sep. 4, 2003

Related U.S. Application Data

(60) Provisional application No. 60/358,316, filed on Feb. 20, 2002.

(51) Int. Cl.[7] .............................................. F16J 15/00
(52) U.S. Cl. ........................ 277/616; 277/609; 277/630; 277/637; 277/640
(58) Field of Search ................................ 277/608, 609, 277/615, 616, 630, 637, 641

(56) References Cited

U.S. PATENT DOCUMENTS

| | | | |
|---|---|---|---|
| 2,547,185 A | | 4/1951 | Von Bothar |
| 3,090,630 A | | 5/1963 | Gasche |
| 3,188,100 A | | 6/1965 | Delgado |
| 4,002,344 A | | 1/1977 | Smith |
| 4,013,373 A | | 3/1977 | Lamprecht et al. |
| 4,114,906 A | * | 9/1978 | Jelinek ...................... 277/596 |
| 4,361,331 A | | 11/1982 | Kohler |
| 4,511,152 A | | 4/1985 | Fournier |
| 4,877,272 A | | 10/1989 | Chevallier et al. |
| 5,201,835 A | | 4/1993 | Hosie |
| 5,238,136 A | | 8/1993 | Kasugai et al. |
| 5,354,072 A | | 10/1994 | Nicholson |
| 5,413,359 A | | 5/1995 | Latty |
| 5,730,448 A | * | 3/1998 | Swensen et al. ............ 277/630 |
| 5,735,532 A | * | 4/1998 | Nolan et al. ................ 277/630 |
| 6,015,152 A | * | 1/2000 | Swensen et al. ............ 277/321 |
| 6,042,121 A | | 3/2000 | Ma et al. |
| 6,077,485 A | | 6/2000 | Baker |
| 6,286,839 B1 | | 9/2001 | Mitsui et al. |
| 6,357,759 B1 | | 3/2002 | Azuma et al. |
| 6,357,760 B1 | | 3/2002 | Doyle |
| 6,409,180 B1 | * | 6/2002 | Spence et al. ............. 277/608 |
| 2003/0184027 A1 | | 10/2003 | Shibata et al. |

FOREIGN PATENT DOCUMENTS

| | | |
|---|---|---|
| DE | 3442463 | 5/1986 |
| GB | 2361508 | 10/2001 |
| JP | 2000 304132 | 11/2000 |

OTHER PUBLICATIONS

International Search Report mailed Jun. 24, 2003 corresponding to PCT/US 03/5100.
http://topmount.net/seal_types.htm, Seal Designs; Oct. 30, 2001.
http://www.topmount.net/sealing_pe.htm, PerkinElmer Fluid Sciences; Oct. 30, 2001.
http://www.topmount.net/microseal.htm, Microflex; Nov. 6, 2001.

* cited by examiner

*Primary Examiner*—Enoch E. Peavey
(74) *Attorney, Agent, or Firm*—John M. Harrington; Kilpatrick Stockton LLP

(57) ABSTRACT

The present invention relates to a seal comprising an annular sealing body comprising a radially outer peripheral groove, an upper load concentrating projection, a lower load concentrating projection, a compression relief region extending from the center of the load concentrating projections to the radially inner edge of the seal, and a compression relief region extending from the center of the load concentrating projections to the radially outer edge of the seal. Additionally, aspects of the present invention relate to a seal retainer comprising a thin metal sheet comprising a seal retaining aperture comprising a reception lobe and a retention lobe; wherein the reception lobe has a diameter larger than the outer diameter of the seal to be retained therein, and the seal retaining aperture has a diameter larger than the minimum diameter of the arch portion of the outer peripheral groove.

8 Claims, 7 Drawing Sheets

SECTION A-A

SEAL RETAINER

CROSS REFERENCE TO RELATED APPLICATIONS

This application claims priority to U.S. Provisional Patent Application Ser. No. 60/358,316 filed Feb. 20, 2002, the disclosure of which is herein incorporated by reference.

FIELD OF THE INVENTION

The present invention relates to a sealing assembly, and more particularly, to an elastically deformable metallic seal with a plastically deformable load concentration feature and a retainer plate for carrying one or more metallic seals.

BACKGROUND OF THE RELATED ART

Traditional semiconductor manufacturing gas delivery systems consist of components that are welded together with stainless steel tubing. These systems require a large footprint. It is also difficult to change components since they are welded together. Additionally, the weld creates a heat affected area that is prone to corrosion and particle generation.

The new Modular Surface Mount (MSM) technology allows for a much smaller footprint. The components are instead bolted together with a metal seal between components. This creates a much more flexible system for changing components and configurations. The MSM technology also eliminates welding and therefore the heat affected areas. Critical to the success of the MSM technology is an ultra-low leak rate metal seal that is suitable for the cleanliness requirements of the semiconductor industry.

MSM gas delivery systems are used for controlling and modifying gas supplies for the semiconductor industry. These systems generally comprise stainless steel machined blocks that bolt together. There is a plurality of orifices on the top of the blocks. Modular components, such as filters, flow regulators, pressure transducers, pressure switches, valves and the like, are mounted on top of the blocks and the gas path is defined by providing gas from and through the orifices. At every orifice/component juncture, there must be a seal to prevent gas from leaking and contaminates from migrating into the system. For the semiconductor industry ultra-clean, corrosion resistant metal seals are required. These seals must provide very low leakage and minimize distortion or damage to the flange and hardware interfaces with which they are associated. To facilitate handling of small seals in clean room environments, seals are installed in thin metal sheets referred to as retainers. The seals are inserted into holes in the retainers that hold the seals in place during installation. This seal assembly, consisting of a retainer and a plurality of individual seals, is then installed in the interface between modular components. These systems have developed to have standardized interfaces wherein the block size and orifice size and position are uniform throughout the industry. This allows seals to be used universally in most MSM gas delivery systems.

Prior art seals and seal assemblies are shown in FIGS. 1–4. FIGS. 1 and 2 show a typical "C" seal with a helical spring. The seal 10 has a ductile jacket 20 surrounding a helical spring 30. The ductile jacket 20 does not completely enclose the spring 30 leaving a gap 22 that acts to hold the seal in the retainer 50. This configuration allows the seal 10 to be compressed between the modular components with the spring 30 providing force required to plastically deform the load concentrating projections. The complexity of seals of this nature may introduce manufacturing inconsistencies that result in reduced performance.

FIGS. 3 and 4 show a retainer 50 comprising a thin metal sheet with two seal retaining apertures 52 and four fastener holes 60. Relief cuts 54 in the plate allow seals 10 to be installed into the seal-retaining aperture 52. One disadvantage to this design is the propensity for seals to fall out when the retainer is distorted or flexed. Retainers of this design do not provide the positive retention required of such systems.

Examples of other prior art seals for such applications are disclosed in U.S. Pat. No. 6,043,121 to Ma et al. and U.S. Pat. No. 6,409,180 to Spence et al. The metallic rings disclosed therein are formed with a plastically deformable column configured to buckle under an applied load. They generally comprise two flat sealing surfaces with an internal annular groove in the column to allow the seal to be deformed.

It would be desirable to have an effective seal for use in MSM gas delivery systems and other applications where a leak tight, low contamination seal is required. Furthermore, it would be beneficial to have such a seal made of one part to minimize the complexity and thus, propensity for failure. It would further be desired to have such a seal with a design that is simple and adaptable to many other sealing applications.

SUMMARY OF THE INVENTION

In one aspect of the present invention, a seal is provided comprising an annular sealing body comprising a radially outer peripheral groove, an upper load concentrating projection, a lower load concentrating projection, a compression relief region extending from the center of the load concentrating projections to the radially inner edge of the seal, and a compression relief region extending from the center of the load concentrating projections to the radially outer edge of the seal.

A feature and advantage of the seal of the present invention is that it is constructed in one piece and is adaptable to sealing applications where a high vacuum, low particulate seal is required. Further, the basic design and structure may be used in other seal applications, and the size and scope of this invention is only limited by manufacturing and processing concerns.

In another aspect of the present invention, a seal retainer is provided comprising a thin metal sheet comprising a seal retaining aperture comprising a reception lobe and a retention lobe; wherein the reception lobe has a diameter larger than the outer diameter of the seal to be retained therein, and the seal retaining aperture has a diameter larger than the minimum diameter of the arch portion of the outer peripheral groove.

The various aspects of the present invention provide a seal and retainer with improved performance and handling characteristics. While the seal and retainer of the present invention may be used in many different sealing applications, they are particularly well suited for high vacuum, low particulate environments such as MSM gas delivery systems.

DETAILED DESCRIPTION

Figure 5:
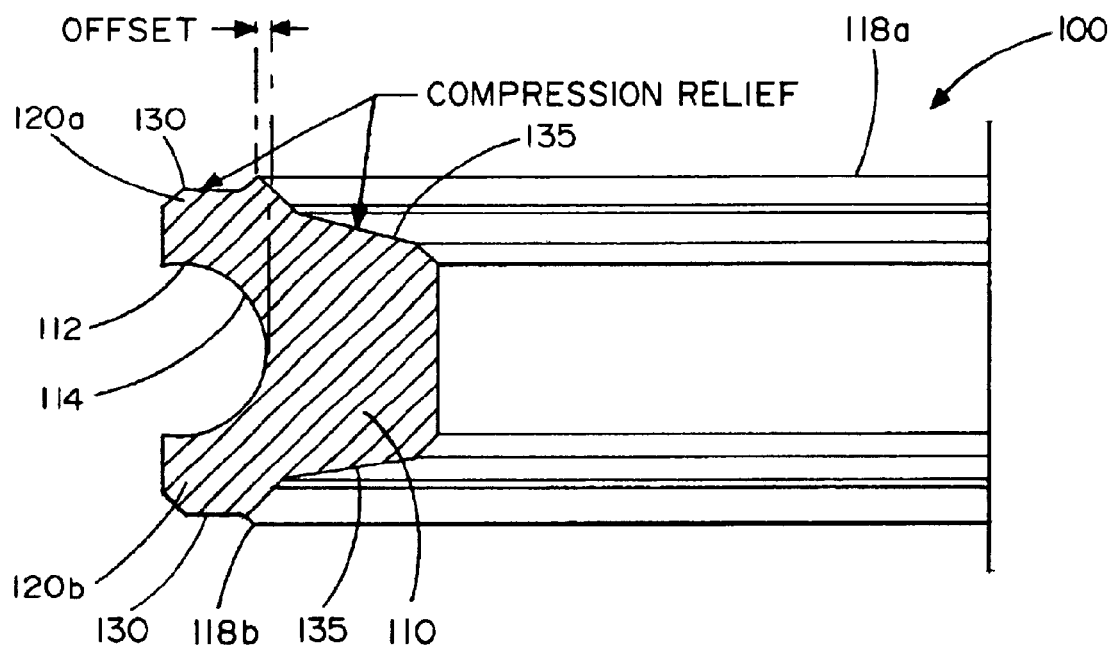
FIG. 5 is a partial cross sectional view of a seal of an embodiment of the present invention.

Referring to the figures wherein like reference numerals identify similar aspects of the several embodiments of the present invention, there is illustrated in FIG. 5 a seal constructed in accordance with the present invention. Seal 100 can be used in a wide variety of sealing applications, but is particularly well suited for an ultra-clean operating environment such as MSM gas delivery systems used in the semiconductor industry.

Figure 1:
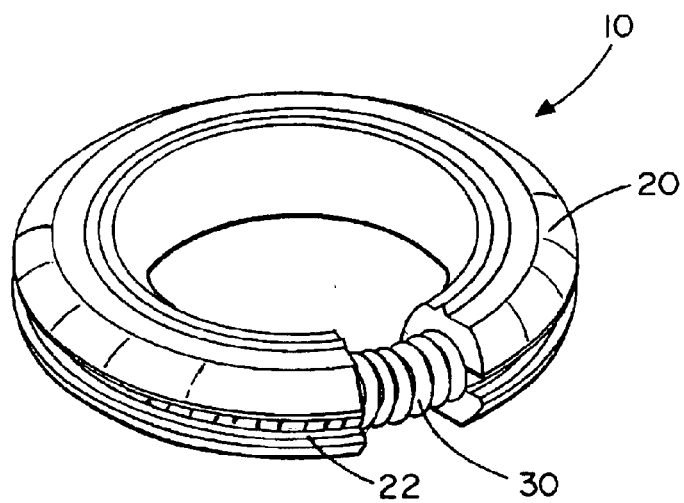
FIG. 1 shows a perspective view of a prior art seal including a cut away portion to show a helical spring therein.
Figure 2B:
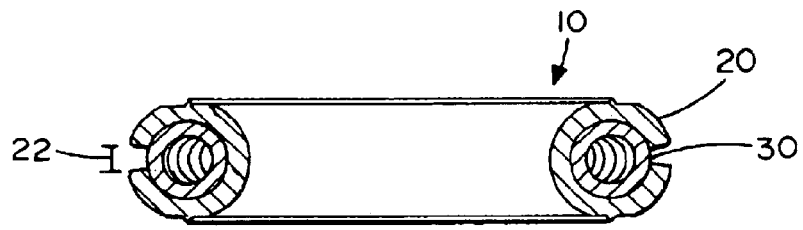
FIG. 2b is a longitudinal cross sectional view of the prior art seal of FIG. 2a. viewed along line A.
Figure 2A:
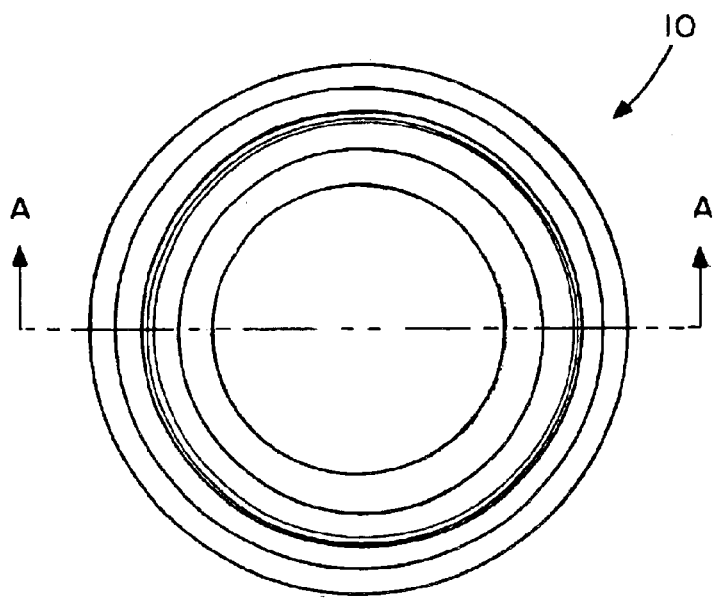
FIG. 2a is a top view of the prior art seal of FIG. 1.
Figure 3:
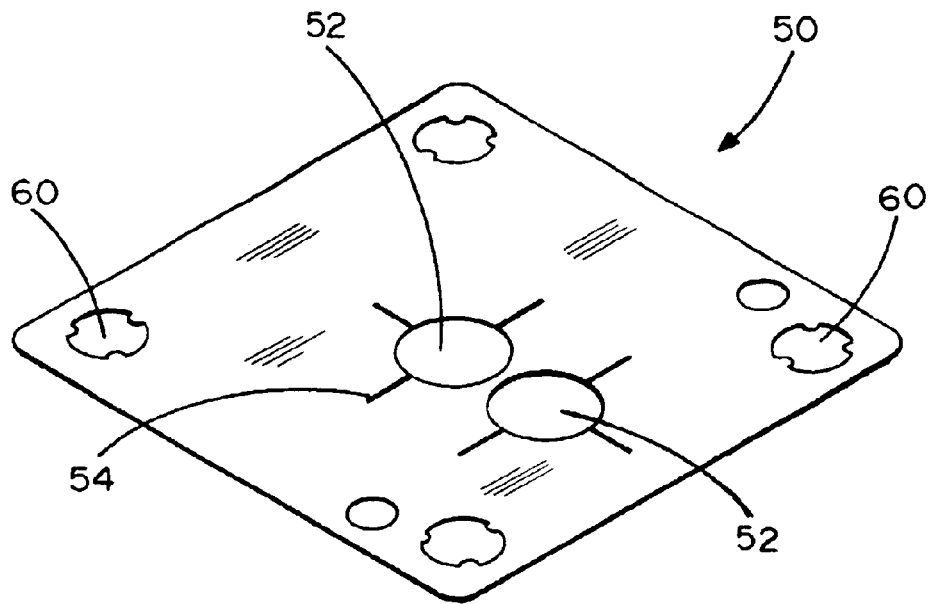
FIG. 3 shows a perspective view of a prior art retainer.
Figure 4:
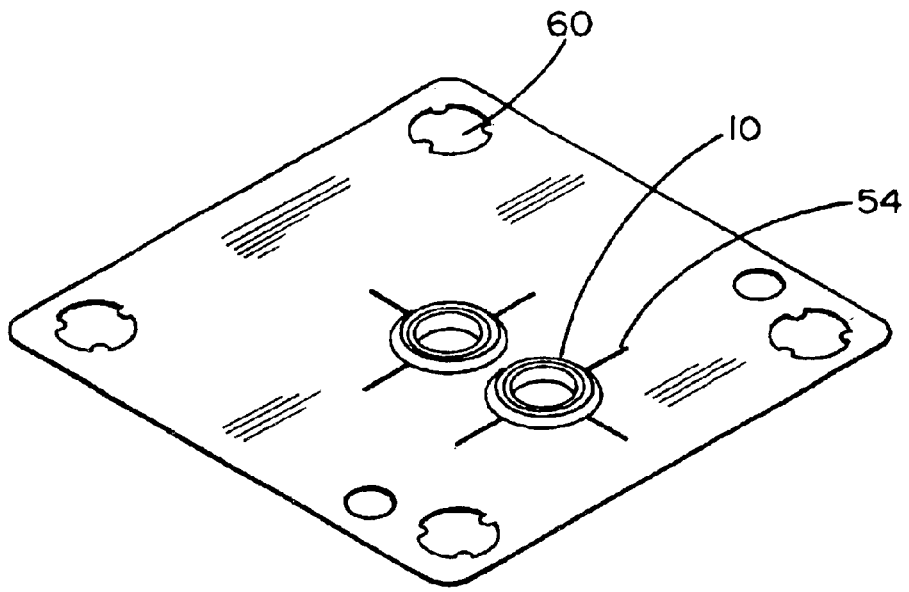
FIG. 4 shows a perspective view the prior art retainer of FIG. 3 with the seal of FIG. 1 inserted therein.

FIG. 1 is a cross sectional view of a seal 100 according to an embodiment of the present invention. Seal 100 comprises an annular sealing body that in a preferred embodiment of the present invention is circular. However, it will be apparent to those skilled in the art that the seal 100 could be manufactured in almost any desired annular shape, such as oval, rectangular, elliptical, etc.

Seal 100 is defined by an annular sealing body 110 constructed from a non-corrosive material. In a preferred embodiment of the present invention, the sealing body 110 comprises a fully annealed stainless steel material, such as high purity 316L or other similar material. Other suitable materials include aluminum, nickel, nickel alloy and copper. The sealing body 110 is preferably annealed and finished by electro-polishing and/or other surface treatments such as chemical passivation to remove residual free iron.

In accordance with a first aspect of the present invention, shown in FIG. 5, sealing body 110 is dimensioned and configured to elastically deform in a controlled and highly predictable manner. More particularly, sealing body 110 has a substantially U-shaped radially outer peripheral groove 112 that defines a flexible, rotating arch portion 114. Under an applied load, the sealing body 110 will undergo semi-elastic deformation in the region of arch portion 114.

Figure 6:
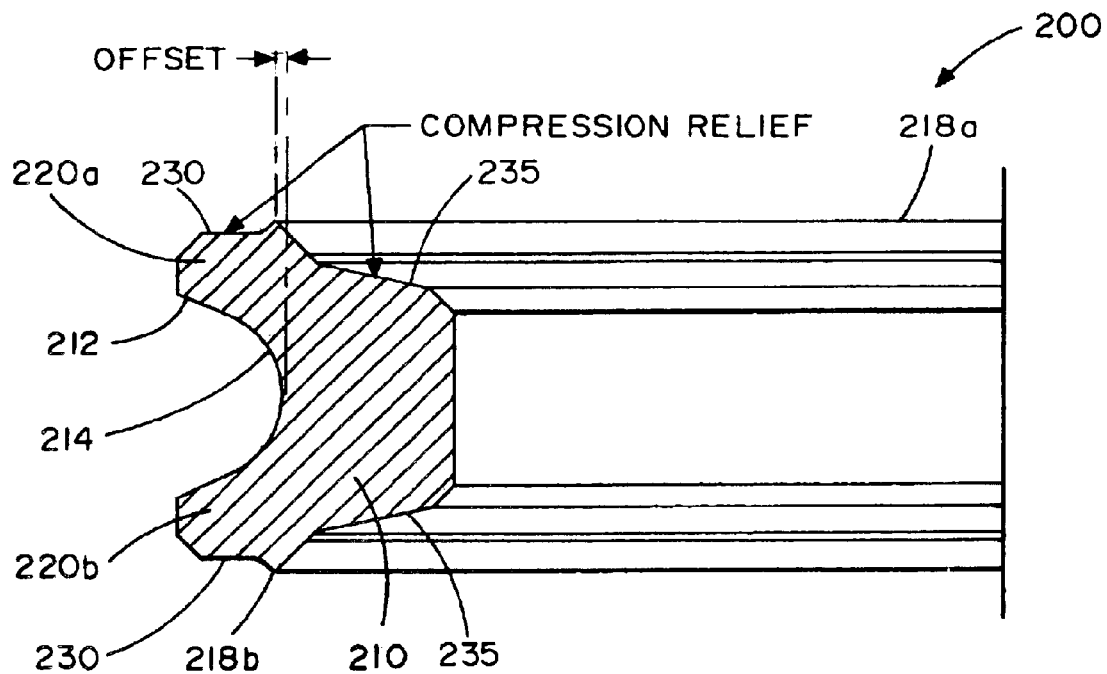
FIG. 6 is a partial cross sectional view of a seal of an embodiment of the present invention.

In another embodiment of the present invention, shown in FIG. 6, a seal 200 is provided. Seal 200 is substantially identical to seal 100 except that the sealing body 210 thereof has a generally "V" shaped radially outer peripheral groove 212 defining a flexible rotating arch portion 214.

Both the U and V shaped configurations have many attributes in common, and as such, the following discussion applies generally to both embodiments. Opposed upper and lower plastically deformable load concentrating projections 118a, 218a and 118b, 218b are provided on the upper and lower portions 120a, 220a and 120b, 220b of the sealing body 110, 210. The portions 120a, 220a and 120b, 220b are defined by the peripheral groove 112, 212 and comprise the region of the sealing body 110, 210 axially above and below the groove 112, 212. The load concentrating projections 118a, 218a and 118b, 218b are positioned at a diameter that is greater than the diameter of the minimum diameter of the peripheral groove 112, 212 and are bounded radially by compression relief regions. This radial offset ensures that a controlled rotation of the arch region 114, 214 will occur when the sealing body 110, 210 is subjected to an applied load. In accordance with one embodiment of the present invention, the force required to create a hermetic seal can be varied by changing the seal cross-sectional height and/or the position of the load concentrating projections relative to the U-shaped arch region 114, 214.

The shape of the sealing body 110, 210 is designed to effectively concentrate load at particular points on a seal retainer so as to effectively provide a seal between two bodies. As can be seen in FIGS. 5 and 6, the peripheral groove 112, 212 comprising a U or V shaped arch portion 114, 214 comprises an apex defined at the radially innermost portion of the arch portion 114, 214. In an embodiment of the present invention where the seal is used in conjunction with a seal retainer, as will be discussed later, the height of the peripheral groove should be slightly larger than the thickness of the seal retainer in order to provide a good seal.

In a preferred embodiment of the present invention, the apex lies at the axial center of the seal. In additional embodiments of the present invention, the apex is offset from the axial center of the seal, or the peripheral groove comprises a groove with two apices and a ridge in between. In a still further embodiment of the present invention, the apex comprises a flat portion creating an axially aligned inner wall at the radially innermost part of the groove.

The axially outer sides 130, 230 of the seal extend radially outward from the load concentrating projections 118a, 118b, and preferably extend parallel to each other in the radial direction. The axially outer sides 130, 230 comprise a compression relief region that is designed to flex when pressure is applied to the seal during a sealing engagement between two flanges. Likewise, the axially outer sides of the seal body, extending radially inward from the load concentrating projections, 135, 235 comprise a second compression relief region. The compression relief regions limit contact on the sealing surfaces of the flanges to the regions of the load concentrating projections. This focuses the load on the load concentrating projections and enhances the plastic deformation required to ensure a hermetic seal.

In another aspect of the present invention, the axially outer sides of the seal extending radially inward 135, 235 from the load concentrating projections preferably slope toward one another. In an embodiment of the present invention, the radially inner body portion of the seal is defined by these sloping sides. The radially inner body portion extends from the apex of the arch portion to a radially inner side. In further embodiments of the present invention, the axially outer sides of the body portion of the seal are curved toward one another or parallel to one another. Additionally, the radially inner side of the seal may be curved and substantially continuous with the curved axially outer sides.

The overall size and specific dimensions of the seal of the present invention will vary according to the particular aspects of the components being sealed. While a seal for use in MSM gas delivery systems has been used as an example throughout this specification, the seals of the present invention are adaptable for use in many sealing applications. The size of the seal is only limited by practical concerns such as cost and manufacturing machinery. The seals of the present invention are configured to be scalable and will function effectively at any given size, from fractions of an inch in diameter to several feet or more. Thus, size is not a limiting factor in the embodiments of the present invention.

While the arch-like peripheral grooves 112, 212 of seals 100, 200 have been described and illustrated as having substantially U and V shaped configurations, respectively, it is envisioned that other similar geometries may be employed without departing from the spirit and scope of the present invention. It is also envisioned that the arch-like structures can exist as an internal groove configuration with the load concentrating features at a smaller diameter that the largest inside diameter of the internal groove to control rotation of the arch region under an applied load. Furthermore, it is envisioned that the load concentrating features, while presented as triangular projections, can exist in other forms such as rounded bead-like projections or rectangular or square projections.

Figure 7:
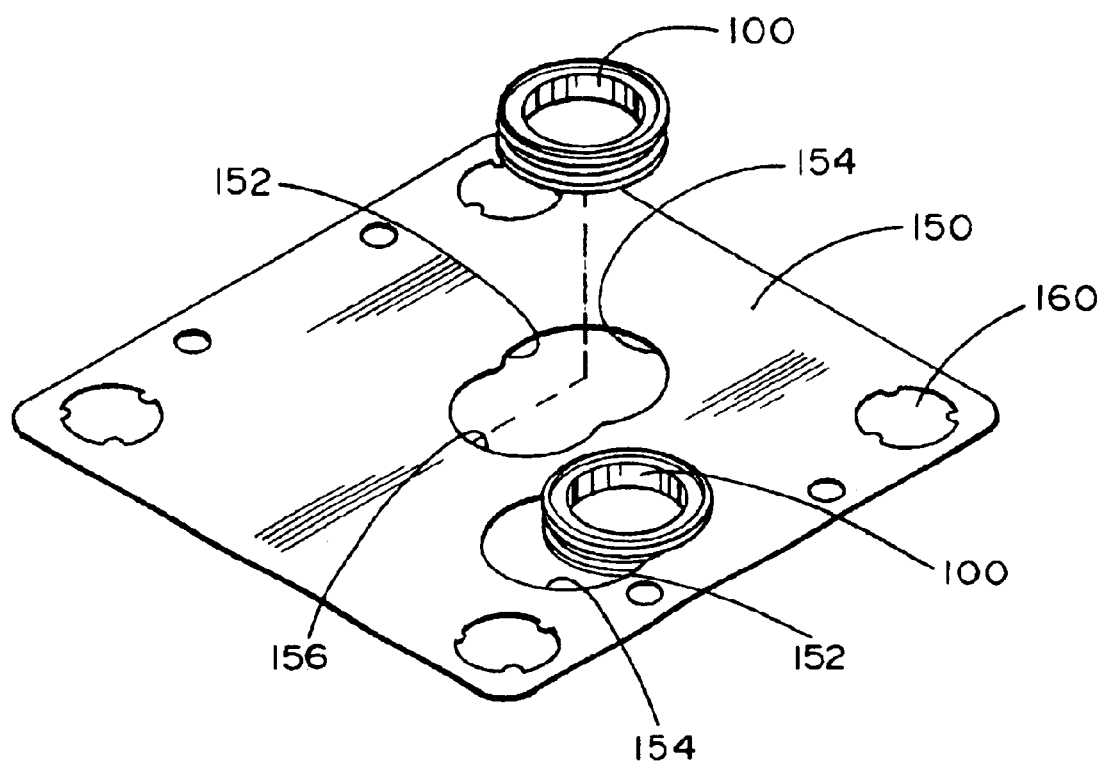
FIG. 7. is a perspective view of a two seal assembly of an embodiment of the present invention including a retainer and two seals.

In a further aspect of the present invention, a seal retainer is provided to hold seals in place during installation. Referring to FIG. 7, the seal retainer 150 of an embodiment of the present invention comprises at least one seal retaining aperture 152 comprising a reception lobe 154 and a retention lobe 156. The diameter of the reception lobe 154 is larger than the diameter of the retention lobe 156. The sizing of the lobes is determined by the size of the seal to be retained therein. The reception lobe is sized to have a diameter slightly larger than the outer diameter of the seal to be used therein. The retention lobe has a diameter slightly larger than the minimum diameter of the arch portion of the outer peripheral groove of the seal to be used therein. The intersection of the reception lobe and the retention lobe define a portion of the retainer, the interference region, with dimension slightly less than the minimum diameter of the arch portion of the outer peripheral groove. This configuration allows a seal to be placed into the reception lobe and slid through the interference region into the retention lobe thus securing the seal in place.

Figure 8:
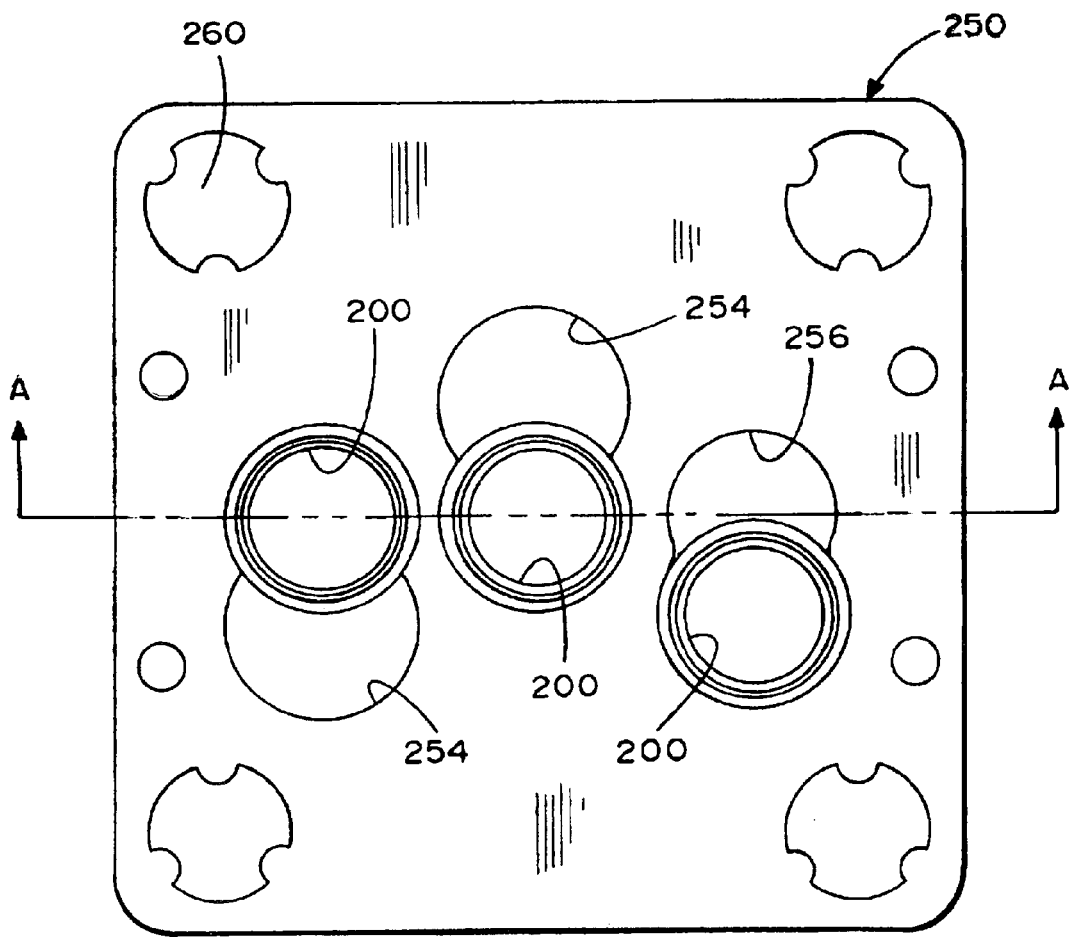
FIG. 8 is a top view of a three seal assembly of an embodiment of the present invention including a retainer and three seals.
Figure 9:
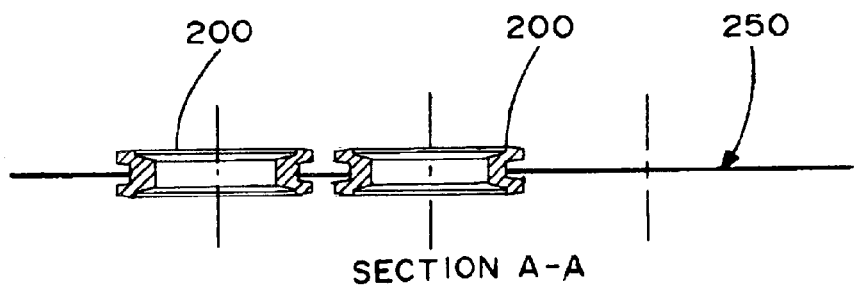
FIG. 9 is a cross sectional view of the seal assembly of FIG. 8 taken along line A showing two seals in the retainer.

In another embodiment of the present invention, shown in FIG. 8, the seal retainer 250 comprises three seal retaining apertures 252 each comprising reception lobes 254 and retention lobes 256. The seal on the left and the seal in the middle are shown to be in the retention lobes 256. The seal on the right is shown to be in the reception lobe 254 as it would be during assembly. Upon completion of assembly, the seal will be slid into place in the retention lobe 256 as are the other seals. In a preferred embodiment of the present invention, the retention lobes 256 have centerlines along a common axis, shown as line A—A. FIG. 9 is a cross sectional view of a seal retainer 250 of an embodiment of the present invention showing a view along this common axis A—A. As can be seen from this figure, the seals are held in place by the interaction of the peripheral grooves of the seals with the seal retainer. This prevents the seals from falling out of the seal retainer 250.

In a preferred embodiment of the present invention, the seal retainer 150 is constructed from a stainless steel material such as 300 series SS and is fully hardened. In another preferred embodiment of the present invention, the seal retainer 150 has two seal retaining apertures 152, each comprising a reception lobe 154 and a retention lobe 156. In one embodiment of the present invention, the centerlines of the retention lobes 156 lie on a common axis. In further embodiments of the present invention, other geometries or configurations seal retaining apertures in the retainer can be used where required. Further, the retainer may have any number of seal retaining apertures necessary for a particular application.

Figure 10:
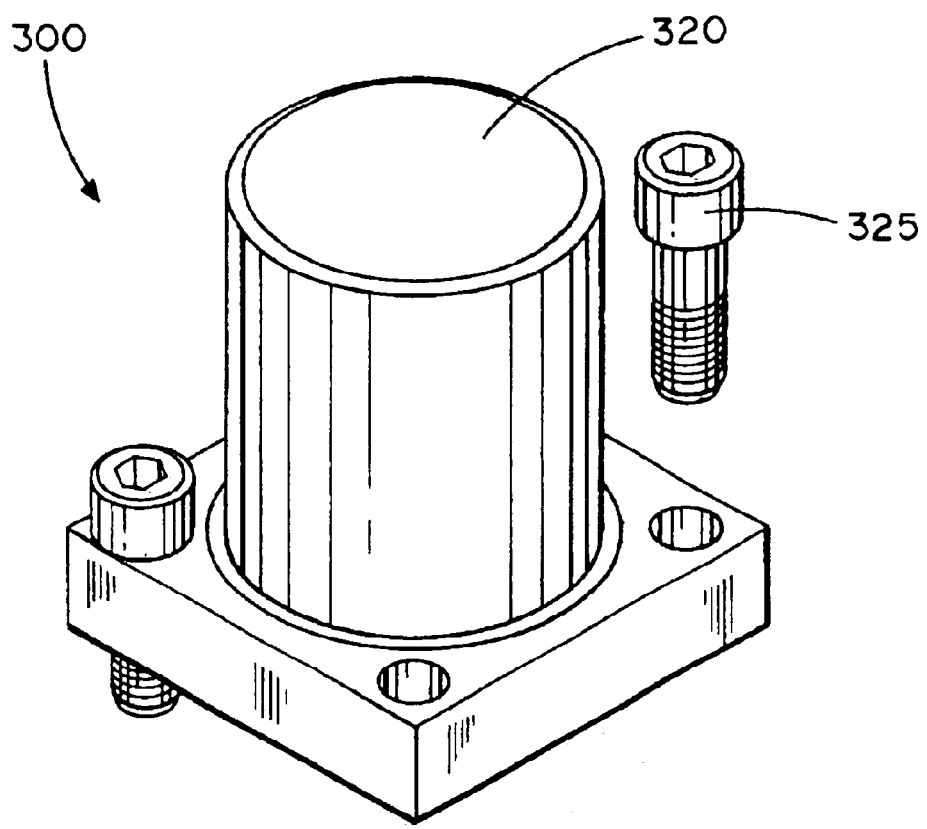
FIG. 10 is an exploded view of a seal assembly of the present invention including a substrate, retainer with seals and a component part.
Figure 10:
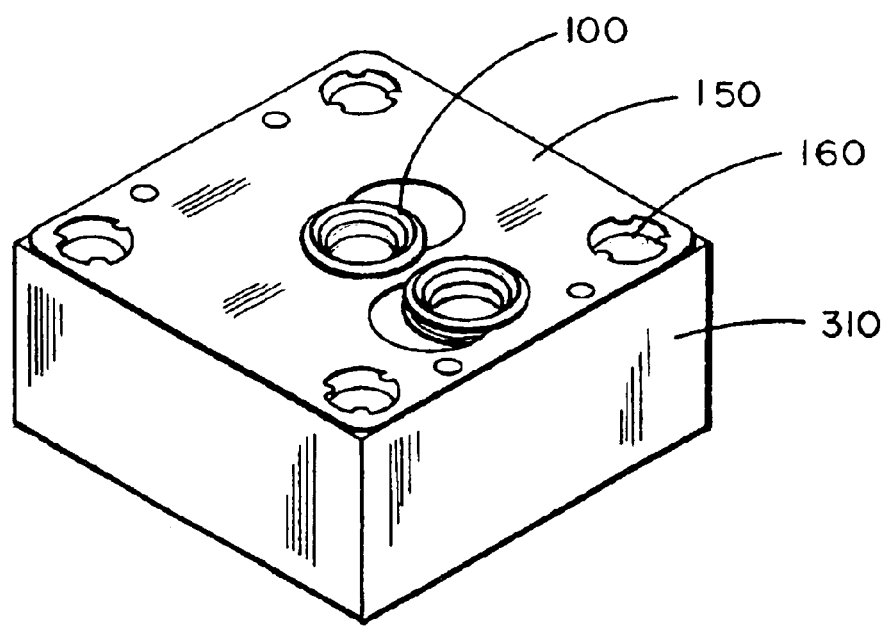

In a further embodiment of the present invention, the seal retainer 150 also comprises fastener holes 160 to accommodate fasteners such as screws or bolts. FIG. 10 shows a seal 100 inserted into a seal retainer 150 mounted on a modular component 310. Another component 320 is positioned above the seal retaining assembly, comprising the seal 100 and seal retainer 150. Bolts 325 are positioned through the fastener holes 160 in the seal retainer 150 to secure the seal assembly 300 together.

Figure 11:
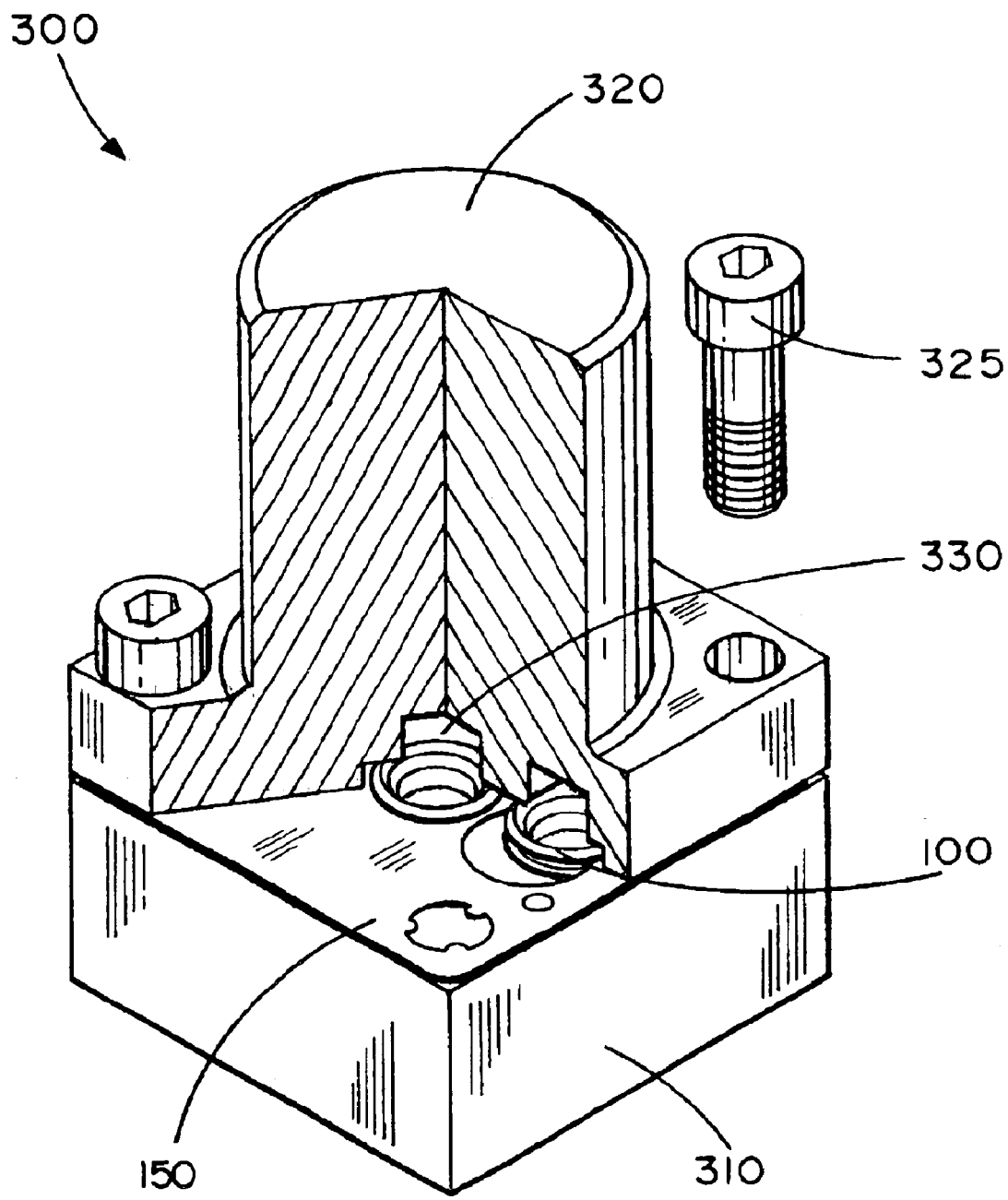
FIG. 11 is a cut away view of the assembly of FIG. 10 showing the complete assembly.

FIG. 11 is a cut away view of the seal assembly 300 comprising a component part 320, a seal assembly comprising a seal 100 and a seal retainer 150, mounted on a modular component 310 and secured with bolts 325. As the component part 320 is fastened to the modular component 310, compressive load is applied to the seal assembly. This compressive force will cause the seal to plastically deform in the region of the load concentrating projections thus creating a hermetic seal. Additionally, the arch portion of the outer peripheral groove undergoes semi-elastic deformation ensuring sufficient contact stress to maintain a hermetic seal during service.

EXAMPLE

The following is an example of a seal and retainer for use in MSM gas delivery systems. The identifying numbers refer to those described above and viewed in FIGS. 4 through 11. The dimensions are provided to give the reader perspective as to relative size and scale and are by no means meant to limit the scope of the invention.

In an exemplary embodiment of the present invention, the seal 100, 200 is dimensioned to fit a standard MSM gas delivery assembly. The seal comprises an inner diameter of about 0.188 inches. The outer diameter of the seal comprises about 0.275 inches, and the axial height of the seal is about 0.063 inches. The outer peripheral groove is designed to fit the inner diameter of a seal retaining aperture in a seal retainer. Thus, the apex of the arch portion extends about 0.0175 inches from the radially outer end of the seal and the peripheral groove is about 0.038 inches high at the radially outer end of the seal.

The axially outer sides of the seal extending radially inward 135, 235 each slope toward one another at an angle of 10° from horizontal. They end at the radially inner side of the seal body which is axially aligned and substantially flat. The load concentration projections are offset radially outward from the apex of the arch portion by about 0.0025 inches and are triangular in shape forming an angle of about 90° at their peak.

In this example of the present invention, the thickness of the seal retainer 150 is about 0.0030 inches. When a seal is inserted into the retainer and the assembly is secured between two components, the seal compresses to 15 to 25 percent in the axial direction, or height of the seal.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A seal retainer comprising:
a thin metallic sheet comprising a seal retaining aperture comprising a reception lobe and a retention lobe each comprising a center point and a diameter;

wherein the center point of the reception lobe and the center point of the retention lobe are separated by a distance, and wherein the diameter of the reception lobe is large that the diameter of the retention lobe and;

wherein a seal having a central aperture is insertable into said reception lobe and slideable from said reception lobe into said retention lobe, and once positioned in the retention lobe, the central aperture of the seal is aligned with a fluid path defined through the center of said seal;

wherein said fluid path defined through the center of said seal coincides with an aperture of said retention lobe.

2. The seal retainer of claim 1, wherein the reception lobe and retention lobe intersect to form an interference region between the center point of the reception lobe and the center point of the retention lobe.

3. The seal retainer of claim 1, wherein the reception lobe has a diameter larger than the outer diameter of a seal to be retained therein, and the seal retaining aperture has a diameter smaller than the outer diameter of said seal.

4. The seal retainer of claim 1, further comprising at least one additional seal retaining aperture comprising a reception lobe and a retention lobe.

5. A seal retaining assembly comprising the seal retainer of claim 4, and at least two seals, each comprising an annular sealing body comprising a radially outer peripheral groove, an upper load concentrating projection, a lower load concentrating projection, and a compression relief region extending from the center of the load concentrating projections to the radially outer edge of the seal.

6. The seal retaining assembly of claim 5 further comprising an additional seal retaining aperture in the seal retainer, and an additional seal associated with the seal retaining aperture.

7. The seal retaining assembly of claim 5, engaged between a substrate and a component part in an assembly wherein the component part is secured to the substrate and compresses the at least two seals in the seal retaining assembly.

8. The seal retaining assembly of claim 7, wherein the seals are elastically deformed in the region of the peripheral groove during compression.

* * * * *

UNITED STATES PATENT AND TRADEMARK OFFICE
CERTIFICATE OF CORRECTION

PATENT NO. : 6,945,539 B2
DATED : September 20, 2005
INVENTOR(S) : Mark S. Whitlow, John S. Harr and Ryan D. McCall It is certified that error appears in the above-identified patent and that said Letters Patent is hereby corrected as shown below:

Column 7,
Line 4, "lobe is large that the diameter of the retention lobe and;" should read -- lobe is larger than the diameter of the retention lobe and; --.

Signed and Sealed this

Fifteenth Day of November, 2005

JON W. DUDAS
*Director of the United States Patent and Trademark Office*